United States Patent [19]

Fukushima

[11] 4,377,218

[45] Mar. 22, 1983

[54] METHOD AND APPARATUS FOR REDUCING ENGINE VIBRATION INDUCED VEHICLE CABIN NOISE AND RESONANCE

[75] Inventor: Masao Fukushima, Fuchu, Japan

[73] Assignee: Nissan Motor Co., Ltd., Yokohama, Japan

[21] Appl. No.: 218,328

[22] Filed: Dec. 19, 1980

[30] Foreign Application Priority Data

Dec. 20, 1979 [JP] Japan .................. 54-166661

[51] Int. Cl.³ .............................. B60K 5/00
[52] U.S. Cl. ................... 180/300; 180/312; 248/559; 248/607; 248/620; 267/30; 267/136
[58] Field of Search ............ 180/300, 312, 297; 248/559, 621, 620, 619, 607, 605; 267/136, 63 R, 63 A, 153, 140.3, 141, 141.1, 35, 30; 188/379

[56] References Cited

U.S. PATENT DOCUMENTS

| 1,840,080 | 1/1932 | Breer . | |
| 3,322,379 | 5/1967 | Flannelly | 248/559 |
| 3,353,771 | 11/1967 | Bow | 248/3 |
| 3,791,676 | 2/1974 | Spratlen | 280/763 X |
| 4,240,517 | 12/1980 | Harlow, Jr. et al. | 180/297 X |
| 4,274,510 | 6/1981 | Mouille et al. | 248/605 X |

FOREIGN PATENT DOCUMENTS

| 2019546 | 11/1971 | Fed. Rep. of Germany . | |
| 2292153 | 6/1976 | France . | |
| 54-55215 | 5/1979 | Japan | 248/559 |
| 852706 | 10/1960 | United Kingdom . | |
| 1115377 | 5/1968 | United Kingdom . | |
| 1200191 | 7/1970 | United Kingdom . | |

Primary Examiner—Robert J. Spar
Assistant Examiner—Donald W. Underwood
Attorney, Agent, or Firm—Thompson, Birch, Gauthier & Samuels

[57] ABSTRACT

A buffer rod is interconnected between an engine and a chassis of a vehicle in addition to the main engine mounts. The rod has a resonance frequency slightly lower than the engine vibration frequency at which resonance in the vehicle cabin is apt to occur. Upon reaching the resonance frequency of the rod, the phase of vibration passing through the rod changes so that instead of increasing the spring modulus of the combination of engine mounts and buffer rod to damp vibrations which would otherwise shake the vehicle, the spring modulus thereof is reduced to a very low value due to the interference between the vibration passing through the mounts and the buffer rod. This sudden softening of the engine suspension as a whole, damps the engine vibrations which would otherwise induce resonance in the vehicle cabin.

8 Claims, 11 Drawing Figures

METHOD AND APPARATUS FOR REDUCING ENGINE VIBRATION INDUCED VEHICLE CABIN NOISE AND RESONANCE

BACKGROUND OF THE INVENTION

1. Field of the Invention

The present invention relates generally to an automotive vehicle and more particularly to an arrangement for mounting the engine on the chassis thereof so that engine vibration induced resonance within the cabin is reduced.

2. Description of the Prior Art

In a known arrangement a buffer rod has been added to the normal engine mounting arrangement for increasing the stiffness of the engine mounting in an effort to reduce the vibration transmitted to the vehicle body from the engine, which vibration tends to induce annoying noise and/or resonance within the vehicle cabin during frequently used middle engine speed operating conditions. However this arrangement has failed to be effective in that, to prevent the buffer rod per se from unwantedly resonating during middle speed operation, it has been necessary to select the vibrational characteristics so that the resonance frequency thereof is above the maximum frequency of the vibration outputted by the engine during middle speed operation, which in turn has lead to the phenomenon that the vibrational force transmitted to the vehicle body through the normal engine mounts and through the buffer rod re-enforce each other to actually increase the noise and/or resonance within the vehicle cabin. Accordingly, it has been necessary to increase the mass and size of the elastomeric members used in the engine mountings, which in turn makes the disposition of same within a crowded engine compartment difficult and increases the overall weight of the vehicle. Further, this measure has proven to be only partly effective.

SUMMARY OF THE INVENTION

The present invention features a buffer rod which has vibrational characteristics such that the resonance frequency thereof is slightly lower than the engine vibration frequency which causes the resonance or vibration within the vehicle cabin and which thus provides a dynamic damping effect. This dynamic damping effect phenomenon is brought about by the change in phase of the vibration transmitted by the buffer rod of the invention at or about its resonance frequency, whereby during engine operation which produces low frequency vibration (viz., shaking) the buffer rod functions to increase the rigidity of the engine mounting arrangement as a whole and upon approaching and/or exceeding the frequency at which the buffer rod resonates, the rod functions to reduce the rigidity of the engine mounting arrangement as a whole and induce suitable conditions for preventing the transmission of higher frequency vibrations which produce sound. More specifically, the change in the phase of vibration transmitted through the buffer rod at or about its resonance frequency causes the vibration transmitted through the engine mounts per se and the vibration transmitted through the buffer rod to interfere and offset each other just prior to the frequency at which the vehicle cabin will be subject to resonance noise, so that highly improved engine vibration damping is achieved throughout low and middle speed vehicle operation, notably improving the vehicle cabin environment.

BRIEF DESCRIPTION OF THE DRAWINGS

The features and advantages of the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 1:
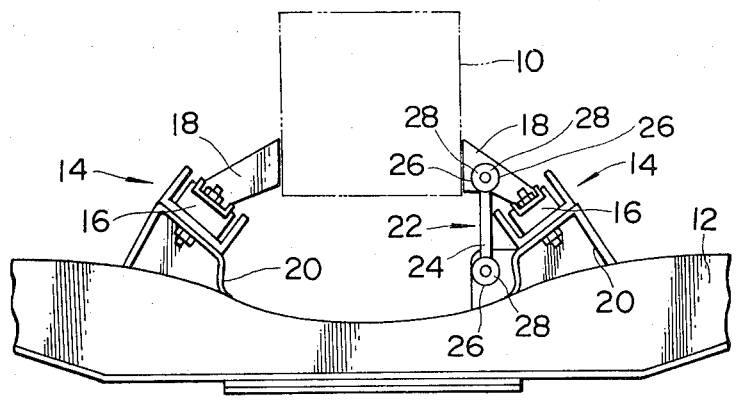
FIG. 1 is a schemmatic view showing an engine mounted to a vehicle by elastomeric mounting members, which arrangement is provided with a buffer rod according to a first embodiment of the present invention.
Figure 3:
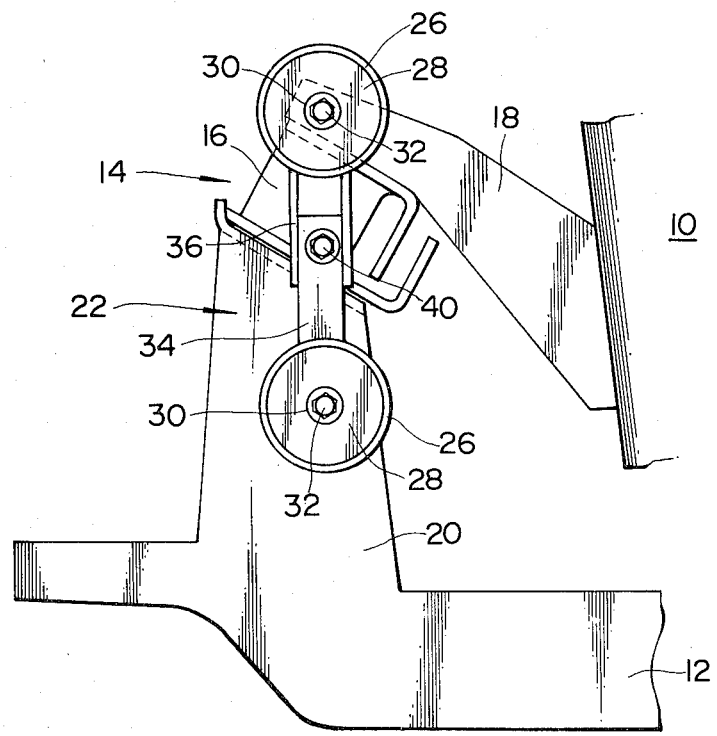
FIGS. 3 and 4 are respective front and side elevational views showing a second embodiment of the present invention.

Turning now to the drawings and more specifically to FIG. 1, an engine 10 is shown mounted to the vehicle body or chassis 12 through engine mounts 14. The engine mounts (only two illustrated) include elastomeric insulators 16 which are interposed between brackets 18 fixedly connected to the engine proper and brackets fixedly connected to the vehicle chassis or body 12. A buffer rod 22 is arranged to interconnect one of the brackets 18 with a corresponding one of the brackets 20. The buffer rod comprises a rigid rod 24 provided with cylindrical housing members 26 at each end, elastomeric insulators 28 disposed within the cylindrical members 26 and tubes 30 disposed through the insulators concentric with the cylindrical members. Bolts 32 are disposed through the tubes 30 to connect one end of the buffer rod 22 to the bracket 18 and at the other end to the bracket 20.

However, in order for the buffer rod of the present invention to produce the desired dynamic damping effect, it is necessary to carefully select the spring moduli of the elastomeric insulators 28 and the mass of the rod 24 and cylindrical members 26 with respect to the engine vibration frequency.

When an engine vibrates with a frequency of 0 to approximately 90 Hz (low frequency range), only shaking of the vehicle results. However, after exceeding a given frequency and entering the high frequency range (approx. 90 to 200 Hz) the vibrations emitted from the engine induce resonance in the cabin of the vehicle and accordingly produce annoying noise. Thus, it is desirable according to the present invention to select the suspended mass of the buffer rod (viz., rod 24 and cylindrical members 26) to be within 300 to 1200 gm and the spring modului of the elastomeric insulators 28 to be within 5 Kg./mm to 30 Kg./mm, so that buffer rod will have a resonance frequency of between 90 and 140 Hz.

Figure 2A:
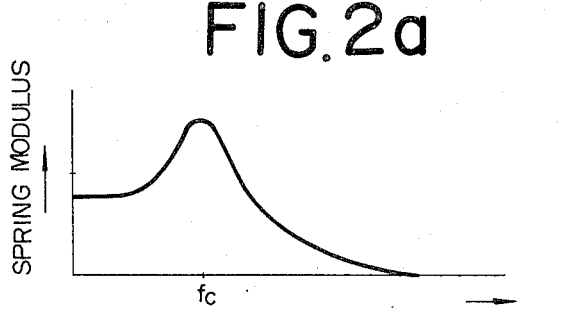
FIGS. 2a, 2b, 2c and 2d are graphs which respectively show, in terms of spring moduli, vibration phase and frequency, (a) the spring characteristics of the buffer rod, (b) the change in phase of the vibration transmitted by the buffer rod at or about the resonance frequency thereof, (c) the spring characteristics of the metal brackets forming part of the engine mounts and (d) the result of utilizing the buffer rod of the present invention (i.e., the combined effect of the characteristics shown in FIGS. 2a–c.)

To better understand the present invention it is deemed advantageous to now consider FIGS. 2a to 2d. FIG. 2a shows, in terms of spring modulus or constant on the ordinate and engine frequency on the abscissa, the spring characteristics of the buffer rod according to the present invention. As can be seen, the spring modulus of the buffer rod maximizes at the resonance frequency (fc) of the rod and thereafter diminishes to approximately zero. It should also be noted that as the frequency approaches that at which the buffer rod resonates, the spring modulus is relatively constant at a given value.

Figure 2B:
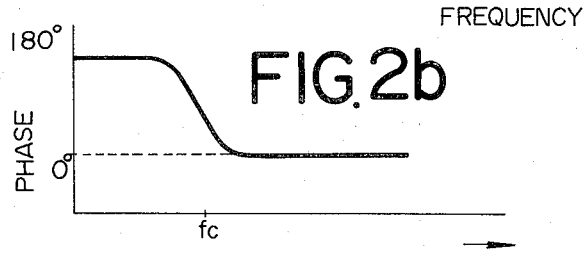

FIG. 2b shows the change in phase of the vibration transmitted by the buffer rod as the frequency thereof approaches and passes the value at which the rod resonates. As shown, this phase undergoes a 180 degree change and remains essentially constant after the change.

Figure 2C:
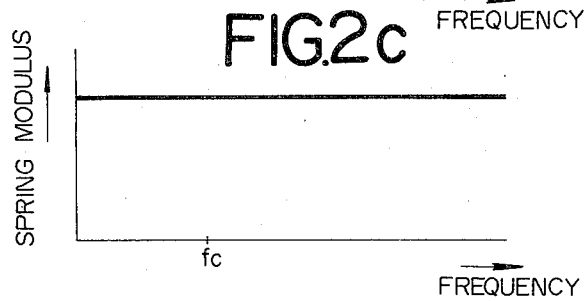

FIG. 2c shows the spring characteristics of the main engine mounts 14. However, in this case, for ease of analysis and explanation, the effect of the elastomeric insulators 16 is omitted so that the spring modulus of the mounts is, as shown, constant and independent of the frequency of the vibration transmitted therethrough.

Figure 2D:
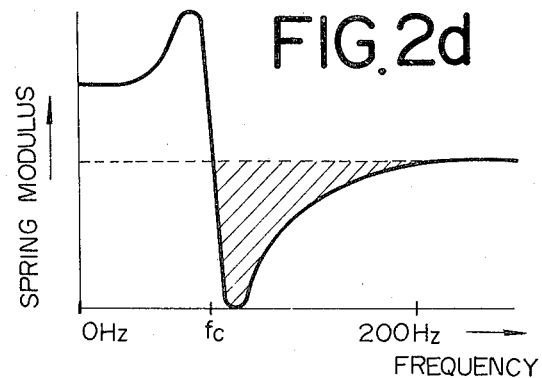
Figure 4:
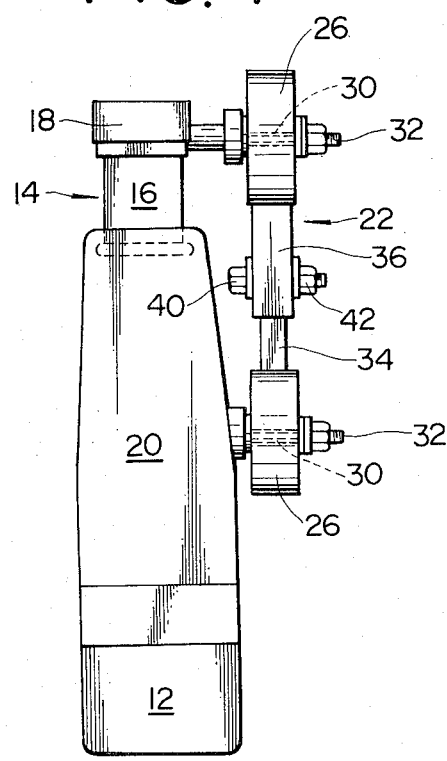
Figure 5:
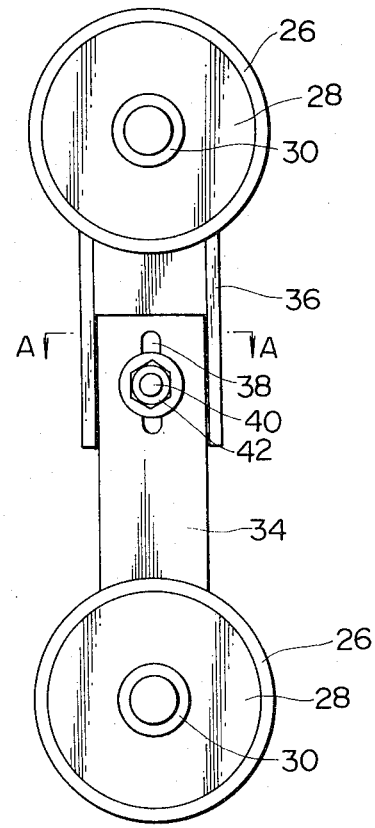
FIGS. 5 and 6 are enlarged respective front and side elevational views of the buffer rod according to the second embodiment of the present invention.
Figure 6:
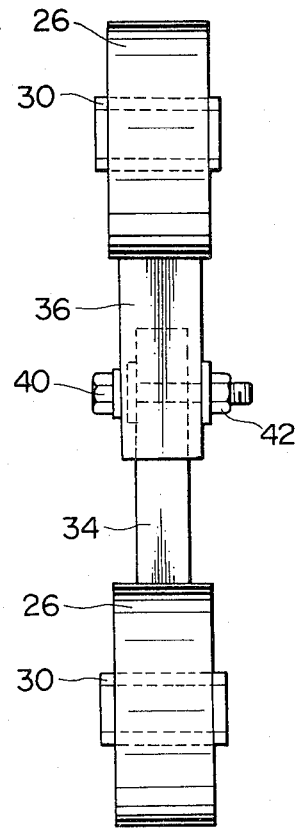
Figure 7:
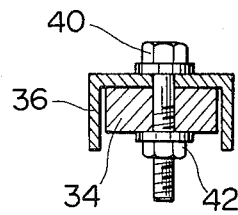
FIG. 7 is a sectional view taken along section line A—A of FIG. 5.

FIG. 2d shows the compound effect of the combination of the main engine mounts 14 and the buffer rod 22 according to the present invention. From this graph it will be appreciated that as the frequency rises toward the resonance frequency of the buffer rod, the effect of the main engine mounts 14 and the buffer rod 22 combine to increase the hardness or spring modulus of the engine suspension or mounting system as a whole so that the system is able to strongly resist the shaking which is apt to be produced in the low frequency range. However, due the phase change illustrated in FIG. 2b, the vibration transmitted by the main engine mounts and that transmitted by the buffer rod offset each other so that as the frequency of the vibration from the engine approaches the value at which the buffer rod resonates, the suspension system as a whole suddenly becomes "soft", exhibiting a very low spring modulus and assumes a condition suited to damping high frequency range vibration which otherwise would induce noise generating resonance in the cabin of the vehicle. Thereafter, the spring modulus of the system gradually rises. However, as shown on the FIG. 2d graph by the hatching, the suspension system as a whole remains soft until the end of the high frequency range (viz., 90 to 200 Hz) and the beginning of the infrequently experienced very high frequency range (i.e. 200 to approx. 500 Hz).

Hence, with the arrangement of the present invention, it is possible to "harden" the engine mounting or suspension system at low engine vibration frequencies to prevent shaking of the vehicle and as the engine vibration approaches the frequency at which sound and particularly resonance in the vehicle cabin is apt to occur, the suspension can be automatically "softened" to effectively damp the sound generating vibrations.

Figure 8:
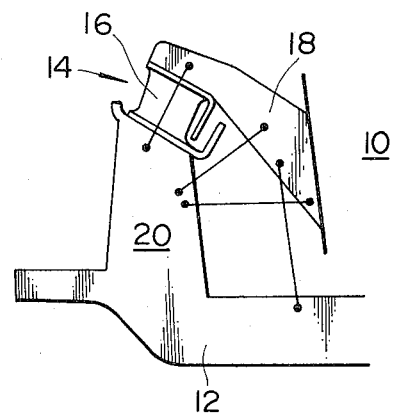
FIG. 8 is a sketch showing a number of possible dispositions of the buffer rod according to the present invention.

FIGS. 3 to 6 show a second embodiment of the present invention. In this arrangement, the rod is rendered adjustable in length for facilitating the adaption of the same unit to either different vehicles or different mounting positions within the same vehicle. Examples of the various positions in which the buffer rod is mountable shown in the sketch of FIG. 8.

Referring back to FIGS. 3 to 6, the rod extending between and interconnecting the cylindrical members 26 is divided into male and female members 34 and 36 which are telescopically interconnected. Each of the male and female members 34,36 formed with elongate slots 38 through which a bolt 40 is disposed. With this arrangement, during mounting of the buffer rod to the vehicle, a nut 42 may slackened to permit the members 34 and 36 to move with respect to each other and once set in the appropriate position, tightened to define a rigid interconnection between the cylindrical members 26.

Thus in summary, the present invention features a buffer rod which for the sake of easy understanding, takes the form of a body suspendedly interconnected between the engine and vehicle chassis and which is so constructed that the spring moduli of the springs and the mass of the body are chosen so that just prior to the transmittance of vibration from the engine to the vehicle chassis which will produce resonance in the vehicle cabin, the phase of the vibration transmitted through the springs and the mass undergoes a 180 degree change to, instead of reinforcing the hardness of the engine mountings against shaking, subtract therefrom to soften the suspension of the engine to the point where noise generating vibration can be effectively damped. Hence, throughout the very frequently used low and medium engine speed operation, sound generation within the vehicle cabin can be highly supressed.

What is claimed is:

1. A suspension system for mounting an engine on a chassis, comprising:
    an engine mount having an elastomeric insulating member interposed between said engine and said chassis; and
    means defining a frequency responsive dynamic damper mechanism which interconnects said engine and said chassis for increasing the effective spring modulus of said suspension system when said engine vibrates with a frequency lower than a predetermined engine vibration frequency, and for reducing said effective spring modulus when the engine vibration frequency approaches and/or exceeds said predetermined engine vibration frequency.

2. A suspension system as claimed in claim 1 wherein said dynamic damper mechanism means is a buffer rod having a body suspendedly connected at one end to said engine through a first elastomeric insulator and at the other end to said chassis through a second elastomeric insulator, said body and said first and second elastomeric insulators having a mass and spring moduli respectively which cause said buffer rod to have a resonance frequency slightly lower than said predetermined engine vibration frequency.

3. A suspension system as claimed in claim 2, wherein said buffer rod comprises:
    a rigid rod interconnecting two cylindical housing members in which said first and second elastomeric insulators are disposed; and
    means disposed through each of said first and second elastomeric insulators for connecting said first and second insulators to said engine and said chassis.

4. A suspension system as claimed in claim 3, wherein said rigid rod comprises first and second telescopically interconnected members which are releasably connectable.

5. A method of suspending an engine on a chassis comprising the steps of:
mounting said engine to said chassis by using at least one engine mount in which an elastomeric insulating member is interposed between said engine and said chassis;
interconnecting said engine and said chassis with a frequency responsive dynamic damper mechanism;
utilizing said dynamic damper mechanism for increasing the effective spring modulus of said elastomeric insulating member and said dynamic damper mechanism when said engine vibrates with a frequency lower than a predetermined engine vibration frequency; and
utilizing said dynamic damper mechanism for reducing the effective spring modulus of said elastomeric insulating member and said dynamic damping mechanism upon the engine vibration frequency approaching and/or exceeding said predetermined engine vibration frequency.

6. A method as claimed in claim 5, wherein said dynamic damper mechanism takes the form of a buffer rod having a body suspendedly connected at one end through a first elastomeric insulator and at the other end to said chassis through a second elastomeric insulator, further comprising the steps of:
selecting the mass of said body and the spring moduli of said first and second elastomeric insulators so that the buffer rod has a resonance frequency slightly lower than said predetermined engine frequency.

7. In a vehicle having an engine and a chassis,
suspension means having a predetermined effective spring modulus for suspending said engine on said chassis;
means for increasing said effective spring modulus when said engine vibrates with a frequency lower than a predetermined frequency; and
means for reducing said spring modulus when said engine vibrates at a frequency equal to or greater than said predetermined frequency.

8. In a vehicle having an engine and a chassis,
a suspension system for supporting said engine on said chassis and which has a predetermined effective spring modulus, comprising:
means defining a first vibration transmission path between said engine and said chassis, said first vibration path including an engine mount having an elastomeric insulating member interposed between said engine and said chassis; and
means defining a second vibration path between said engine and said chassis, said second vibration transmission path including means for inducing a phase change in the vibration transmitted therethrough at a predetermined frequency, said vibration phase change causing said effective spring modulus to reduce from a relatively high value to a relatively low value.

* * * * *